(12) United States Patent
Hwang

(10) Patent No.: US 10,175,767 B2
(45) Date of Patent: Jan. 8, 2019

(54) METHOD, DEVICE, SYSTEM AND NON-TRANSITORY COMPUTER-READABLE RECORDING MEDIUM FOR PROVIDING USER INTERFACE

(71) Applicant: FuturePlay Inc., Seoul (KR)

(72) Inventor: Sung Jae Hwang, Seoul (KR)

(73) Assignee: FUTUREPLAY INC., Seoul (KR)

( * ) Notice: Subject to any disclaimer, the term of this patent is extended or adjusted under 35 U.S.C. 154(b) by 32 days.

(21) Appl. No.: 15/266,022

(22) Filed: Sep. 15, 2016

(65) Prior Publication Data
US 2017/0038849 A1     Feb. 9, 2017

Related U.S. Application Data

(63) Continuation of application No. 14/831,594, filed on Aug. 20, 2015, which is a continuation of application No. PCT/KR2014/010644, filed on Nov. 6, 2014.

(30) Foreign Application Priority Data

Apr. 3, 2014   (KR) ........................ 10-2014-0040140

(51) Int. Cl.
*G06F 3/01* (2006.01)
*G06F 3/14* (2006.01)
*G09G 5/12* (2006.01)
*G06F 3/0488* (2013.01)
*G06F 1/16* (2006.01)

(52) U.S. Cl.
CPC ............. *G06F 3/017* (2013.01); *G06F 1/163* (2013.01); *G06F 3/04883* (2013.01); *G06F 3/1423* (2013.01); *G09G 5/12* (2013.01); *G09G 2354/00* (2013.01); *G09G 2370/06* (2013.01)

(58) Field of Classification Search
CPC .... G06F 3/017; G06F 3/04883; G06F 3/1423; G06F 1/163; G09G 5/12; G09G 2354/00; G09G 2370/06
See application file for complete search history.

(56) References Cited

U.S. PATENT DOCUMENTS

2009/0252311 A1   10/2009  Kuiken
2010/0124949 A1*   5/2010  Demuynck ........... G06F 1/1626
                                                            455/569.1
(Continued)

OTHER PUBLICATIONS

Non-Final Office Action dated Nov. 27, 2015 for U.S. Appl. No. 14/831,594, filed Aug. 20, 2015.
(Continued)

*Primary Examiner* — Srilakshmi K Kumar
*Assistant Examiner* — Brent D Castiaux
(74) *Attorney, Agent, or Firm* — Dinsmore & Shohl LLP; Yongsok Choi

(57) ABSTRACT

According to one aspect of the present disclosure, there is provided a method for providing a user interface. The method includes when an input event occurs, acquiring information on postures or motions of a first device and a second device associated with the input event in a preset time interval including the time of occurrence of the input event, and determining a command to be carried out in response to the input event with reference to a relative relationship between the posture or motion of the first device and that of the second device.

12 Claims, 12 Drawing Sheets

First Device (310)

Second Device (320)

(56) References Cited

U.S. PATENT DOCUMENTS

| | | | |
|---|---|---|---|
| 2010/0287513 A1* | 11/2010 | Singh | G06F 3/017 |
| | | | 715/863 |
| 2011/0163944 A1 | 7/2011 | Bilbrey et al. | |
| 2012/0249443 A1 | 10/2012 | Anderson et al. | |
| 2013/0002538 A1 | 1/2013 | Mooring et al. | |
| 2013/0050080 A1* | 2/2013 | Dahl | G01S 5/18 |
| | | | 345/158 |
| 2013/0234924 A1 | 9/2013 | Janefalkar et al. | |
| 2013/0342457 A1 | 12/2013 | Cox et al. | |
| 2015/0153928 A1 | 6/2015 | Chen et al. | |
| 2016/0018944 A1 | 1/2016 | Kim et al. | |

OTHER PUBLICATIONS

Non-Final Office Action dated Apr. 15, 2016 for U.S. Appl. No. 14/831,594, filed Aug. 20, 2015.

* cited by examiner

First Device (310)

Second Device (320)

First Device (310)

Second Device (320)

First Device (310)

Second Device (320)

First Device (310)

Second Device (320)

FIG. 18

| Touch Type | Distance (Velocity) | Direction |
|---|---|---|
| 1810 { Bottom Finger Surface / Side Finger Surface / Top Finger Surface | 1810 — 1820  1  <br> 1810 — 1820  36 | 1810 — 1820  1 <br> 1810 — 1820  36 |

2010

METHOD, DEVICE, SYSTEM AND NON-TRANSITORY COMPUTER-READABLE RECORDING MEDIUM FOR PROVIDING USER INTERFACE

CROSS-REFERENCE TO RELATED APPLICATIONS

This application is a continuation application of U.S. patent application Ser. No. 14/831,594, filed on Aug. 20, 2015, which is a continuation application of Patent Cooperation Treaty (PCT) international application Serial No. PCT/KR2014/010644, filed on Nov. 6, 2014, and which designates the United States, which claims the benefit of the filing date of Korean Patent Application Serial No. 10-2014-0040140, filed on Apr. 3, 2014. The entirety of U.S. patent application Ser. No. 14/831,594, PCT international application Serial No. PCT/KR2014/040644 and Korean Patent Application Serial No. 10-2014-0040140 are incorporated herein by reference.

FIELD

The present disclosure relates to a method, device, system and non-transitory computer-readable recording medium for providing a user interface.

BACKGROUND

The statements in this section merely provide background information related to the present disclosure and may not constitute prior art.

Recently, mobile smart devices having various communication and sensing capabilities and powerful computing capabilities, such as smart phones and smart pads, are being widely used. Among such mobile smart devices, there are relatively small-sized ones that may be worn and carried on a body of a user (e.g., a smart glass, a smart watch, a smart band, a smart device in the form of a ring or a brooch, a smart device directly attached to or embedded in a body or a garment, etc.)

In this situation, a user may desire to perform a task using two or more (different kinds of) smart devices of the user, or may desire a task to be performed in which smart devices of the user and another user are required to be involved together. However, this (latent) intention of the user could not have been properly supported in prior art.

SUMMARY

One object of the present disclosure is to fully solve the above problem.

Another object of the disclosure is to provide a user with a more convenient and extended user interface using a relative relationship between postures or motions of two or more devices by, when an input event occurs, acquiring information on postures or motions of a first device and a second device associated with the input event in a preset time interval including the time of occurrence of the input event, and determining a command to be carried out in response to the input event with reference to a relative relationship between the posture or motion of the first device and that of the second device.

According to one aspect of the disclosure to achieve the objects as described above, there is provided a method for providing a user interface, comprising the steps of: when an input event occurs, acquiring information on postures or motions of a first device and a second device associated with the input event in a preset time interval including the time of occurrence of the input event; and determining a command to be carried out in response to the input event with reference to a relative relationship between the posture or motion of the first device and that of the second device.

According to another aspect of the disclosure, there is provided a device for providing a user interface, comprising: a technical means for, when an input event associated with the device occurs, acquiring information on a posture or motion of the device; and a program module for determining a command to be carried out in response to the input event with reference to a relative relationship between the posture or motion of the device and that of another device.

According to yet another aspect of the disclosure, there is provided a system for providing a user interface, comprising: a control unit for, when an input event occurs, acquiring information on postures or motions of a first device and a second device associated with the input event in a preset time interval including the time of occurrence of the input event, and determining a command to be carried out in response to the input event with reference to a relative relationship between the posture or motion of the first device and that of the second device; and a storage for storing information provided from at least one of the first device and the second device.

In addition, there are further provided other methods, devices and systems to implement the disclosure, as well as non-transitory computer-readable recording media having stored thereon computer programs for executing the methods.

According to the disclosure, a more convenient and extended user interface may be provided to a user using a relative relationship between postures or motions of two or more devices.

According to the disclosure, when an input event such as a touch or drag is generated for a first device by a user with a second device worn on a body part like a wrist, a variety of commands may be readily carried out in response to the user simply adjusting a posture (e.g., a touch posture of a bottom, side, or top finger surface) or a motion (e.g., a motion away from or toward the first device) of the body part.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which:

FIG. 18 illustratively shows visual feedback which is provided according to the extended embodiment of the disclosure.

DETAILED DESCRIPTION

Figure 1:
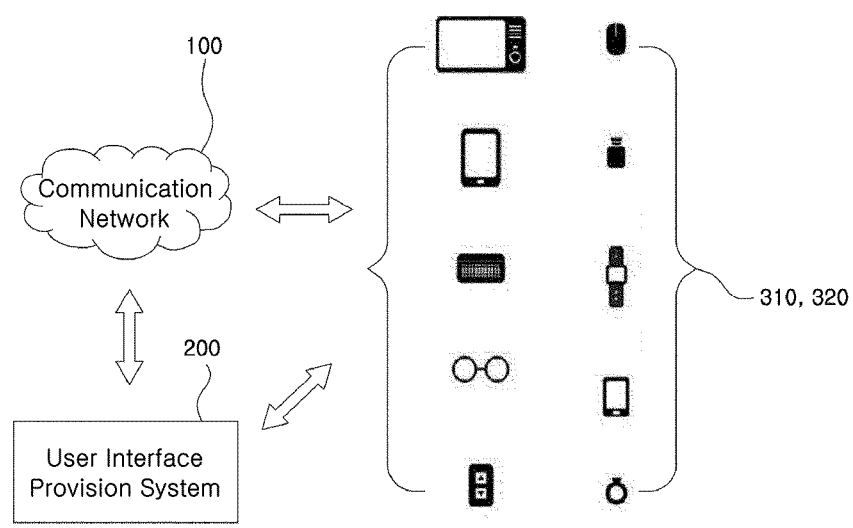
FIG. 1 schematically shows the configuration of an entire system for providing a user interface according to one embodiment of the disclosure.

In the following detailed description of the present disclosure, references are made to the accompanying drawings that show, by way of illustration, specific embodiments in which the disclosure may be practiced. These embodiments are described in sufficient detail to enable those skilled in the art to practice the disclosure. It is to be understood that the various embodiments of the disclosure, although different from each other, are not necessarily mutually exclusive. For example, specific shapes, structures and characteristics described herein may be implemented as modified from one embodiment to another without departing from the spirit and scope of the disclosure. Furthermore, it shall be understood that the locations or arrangements of individual elements within each of the disclosed embodiments may also be modified without departing from the spirit and scope of the disclosure. Therefore, the following detailed description is not to be taken in a limiting sense, and the scope of the disclosure, if properly described, is limited only by the appended claims together with all equivalents thereof. In the drawings, like reference numerals refer to the same or similar functions throughout the several views.

Hereinafter, embodiments of the present disclosure will be described in detail with reference to the accompanying drawings to enable those skilled in the art to easily implement the disclosure.

Configuration of an Entire System

FIG. 1 schematically shows the configuration of an entire system for matching multiple devices according to one embodiment of the disclosure.

As shown in FIG. 1, the entire system according to one embodiment of the disclosure may comprise a communication network 100, a user interface provision system 200, and multiple devices 310, 320.

First, the communication network 100 according to one embodiment of the disclosure may be implemented regardless of communication modality such as wired and wireless communications, and may be constructed from a variety of communication networks such as local area networks (LANs), metropolitan area networks (MANs), and wide area networks (WANs). Preferably, the communication network 100 described herein may be the Internet or the World Wide Web (WWW). However, the communication network 100 is not necessarily limited thereto, and may at least partially include known wired/wireless data communication networks, known telephone networks, or known wired/wireless television communication networks.

Next, the user interface provision system 200 according to one embodiment of the disclosure may be digital equipment having a memory means and a microprocessor for computing capabilities. The user interface provision system 200 may be a server system. The user interface provision system 200 may function to mediate so that via the communication network 100, one of the devices 310, 320 may transmit information or a control command to the other, or the one may receive information or a control command from the other.

To this end, as will be described in detail below, the user interface provision system 200 may function to provide a user with a more convenient and extended user interface using a relative relationship between postures or motions of two or more devices by, when an input event occurs, acquiring information on postures or motions of a first device 310 and a second device 320 associated with the input event in a preset time interval including the time of occurrence of the input event, and determining a command to be carried out in response to the input event with reference to a relative relationship between the posture or motion of the first device 310 and that of the second device 320.

The provision of the user interface may be performed by a control unit (not shown) included in the user interface provision system 200. The control unit may reside in the user interface provision system 200 in the form of a program module. The program module may be in the form of an operating system, an application program module, or other program modules. Further, the program module may also be stored in a remote storage device that may communicate with the user interface provision system 200. Meanwhile, such a program module may include, but not limited to, a routine, a subroutine, a program, an object, a component, a data structure and the like for performing a specific task or executing a specific abstract data type as will be described below in accordance with the disclosure.

Further, the user interface provision system 200 may further function to store information on posture or motion provided from at least one of the multiple devices 310, 320 and allow the information to be used by at least one of the multiple devices 310, 320. The storing may be performed by a storage (not shown) included in the user interface provision system 200. The storage encompasses a computer-readable recording medium, and may refer not only to a database in a narrow sense but also to a database in a broad sense including file system-based data records and the like.

The function of the user interface provision system 200 will be discussed in more detail below. Meanwhile, although the user interface provision system 200 has been described as above, the above description is illustrative and it is apparent to those skilled in the art that at least some of the functions or components required for the user interface provision system 200 may be implemented or included in at least one of the multiple devices 310, 320 to be operated, as necessary.

Lastly, the multiple devices 310, 320 according to one embodiment of the disclosure are digital equipment that may function to connect to and then communicate with the user interface provision system 200 or a counterpart of the multiple devices 310, 320 (which may preferably be separated or externalized from each other), and any type of digital equipment having a memory means and a microprocessor for computing capabilities may be adopted as the devices 310, 320 according to the disclosure. The devices 310, 320 may be so-called smart devices such as a smart phone, a smart pad, a smart glass, a smart watch, a smart band, and a smart ring, or may be somewhat traditional devices such as a desktop computer, a notebook computer, a workstation, a personal digital assistant (PDA), a web pad, a mobile phone, buttons, a mouse, a keyboard, and an electronic pen.

Particularly, according to one embodiment of the disclosure, the devices 310, 320 may include at least one technical means for receiving an operation from a user. Examples of the technical means may include commonly known components such as a touch panel, a pointing tool (e.g., a mouse, a stylus, an electronic pen, etc.), a graphical object operable by the user, a keyboard, a toggle switch, a biometrics (like fingerprints) sensor, a distance sensor, and the like.

Further, according to one embodiment of the disclosure, the devices 310, 320 may include at least one technical means for acquiring physical information on postures or motions of the devices 310, 320. Examples of the technical means may include commonly known components such as a motion sensor, an acceleration sensor, a gyroscope, a magnetic sensor, a positioning module (a GPS module, a beacon-based positioning (position identification) module, etc.), a barometer, a distance sensor, a camera, and the like.

Furthermore, the devices 310, 320 may further include an application program for processing the above physical information to transmit information or a control command to another device (310, 320, or the like), to receive information or a control command from another device (310, 320, or the like), or to generate the information or control command. The application may reside in the corresponding devices 310, 320 in the form of a program module. The nature of the program module may be generally similar to that of the aforementioned control unit of the user interface provision system 200. Here, at least a part of the application may be replaced with a hardware or firmware device that may perform a substantially equal or equivalent function, as necessary.

Meanwhile, according to one embodiment of the disclosure, when it is recognized that the first device 310 and the second device 320 have an association (e.g., indicating that they belong to the same user, they function for the sake of the same user, they are located substantially close to each other, or one of them is competent to authenticate or permit the other), a connection may be formed between the first device 310 and the second 320. The recognition or connection may be performed by the user interface provision system 200 or by the first device 310 and the second device 320.

EMBODIMENTS

Hereinafter, specific examples of methods for providing a user interface in which the multiple devices 310, 320 are involved according to various embodiments of the disclosure will be discussed in detail.

1. First Embodiment

According to the present embodiment, when an input event occurs, information on postures of the first device 310 and the second device 320 associated with the input event in a preset time interval including the time of occurrence of the input event may be acquired, and a command to be carried out in response to the input event may be determined on the basis of a relative relationship between the posture of the first device 310 and that of the second device 320.

Specifically, according to the present embodiment, the input event may occur on the first device 310, and the second device 320 may be integrally combined with an input means for generating the input event. Further, according to the present embodiment, a command to be carried out in response to the input event may be determined according to a relationship between the direction of the first device 310 and that of the second device 320, which are specified with respect to at least one coordinate axis in the preset time interval including the time of occurrence of the input event.

FIGS. 2 to 5 illustratively show how a user interface is provided according to the first embodiment of the disclosure. In FIGS. 2 to 5, it may be assumed that a user generates an input event of touching a touch panel of the first device 310 by a finger or the like of the user's hand wearing the second device 320.

Figure 2:
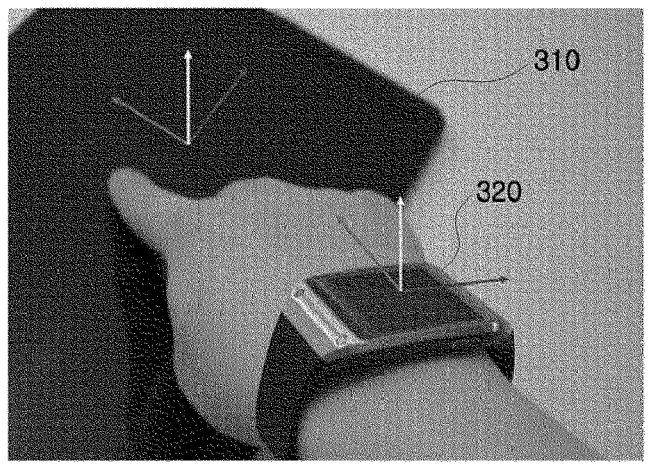
FIG. 2 illustratively shows how a user interface is provided according to a first embodiment of the disclosure.
Figure 2:
Figure 2:

First, referring to FIG. 2, the user may generate an input event of touching the touch panel of the first device 310 by a bottom finger surface of the hand wearing the second device 320. In this case, the normal direction of a plane specifying the touch panel of the first device 310 (i.e., a Z-axis direction when the plane specifying the touch panel of the first device 310 is defined by X and Y axes) is similar to that of a plane specifying a front surface of the second device 320 (i.e., a Z'-axis direction when the plane specifying the front surface of the second device 320 is defined by X' and Y' axes). Accordingly, the angle formed by the two directions falls within a predetermined value (e.g., falls between 0 to 60 degrees).

Figure 3:
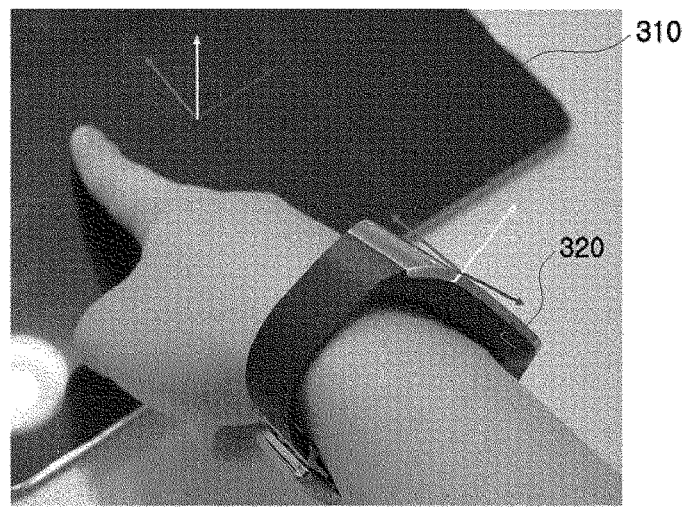
FIG. 3 illustratively shows how a user interface is provided according to a first embodiment of the disclosure.
Figure 3:
Figure 3:

Next, referring to FIG. 3, the user may generate an input event of touching the touch panel of the first device 310 by a side finger surface of the hand wearing the second device 320. In this case, the normal direction of the plane specifying the touch panel of the first device 310 is fairly different from that of the plane specifying the front surface of the second device 320. Accordingly, the angle formed by the two directions falls within a predetermined value range (e.g., falls between 60 to 120 degrees).

Figure 4:
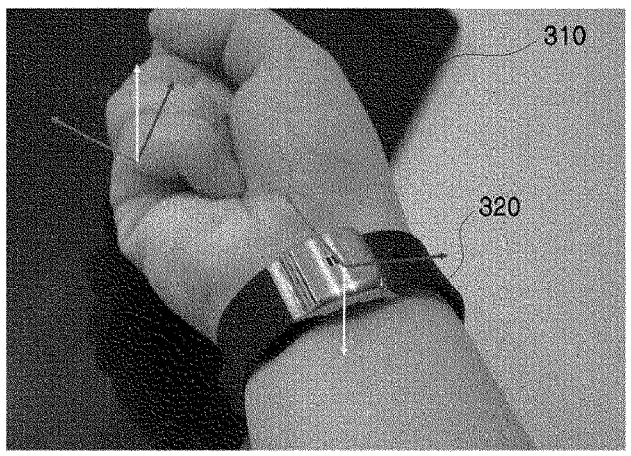
FIG. 4 illustratively shows how a user interface is provided according to a first embodiment of the disclosure.
Figure 4:
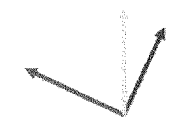
Figure 4:

Next, referring to FIG. 4, the user may generate an input event of touching the touch panel of the first device 310 by a back or a top finger surface of the hand wearing the second device 320. In this case, the normal direction of the plane specifying the touch panel of the first device 310 is greatly different from that of the plane specifying the front surface of the second device 320. Accordingly, the angle formed by the two directions exceeds a predetermined value (e.g., falls between 120 to 180 degrees).

As discussed with FIGS. 2 to 4, the relative relationship between the direction of the first device 310 and that of the second device 320 varies with the type of action taken by the user to generate the input event. Thus, according to the present embodiment, a command to be carried out in response to the input event may be determined with reference to the relative relationship between the direction of the first device 310 and that of the second device 320 (i.e., the angle formed by the two directions). Accordingly, the action taken by the user when generating the input event may be matched with the command to be carried out in response to the input event.

Figure 5:
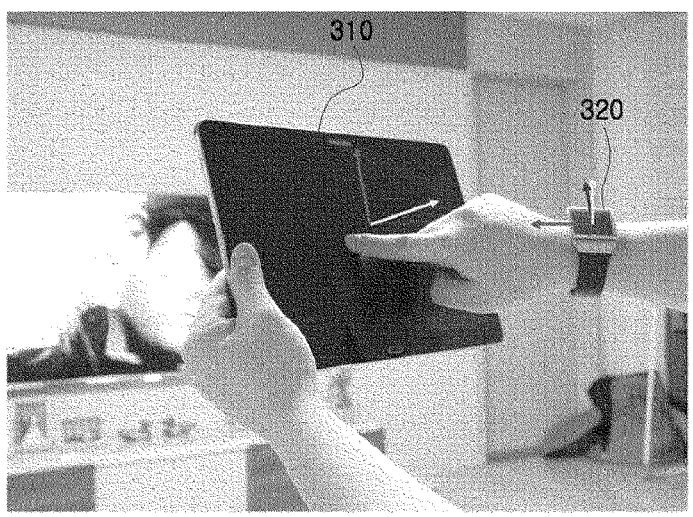
FIG. 5 illustratively shows how a user interface is provided according to a first embodiment of the disclosure.
Figure 5:
Figure 5:
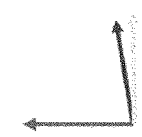

Meanwhile, according to the present embodiment, since a command to be carried out in response to an input event is determined with reference to a relative relationship between the posture of the first device 310 and that of the second device 320, the type of action taken by the user when generating the input event may be accurately recognized even if the first device 310 or the second device 320 is moved or rotated in an absolute coordinate system specifying a real-world space (e.g., even if the user uses the first device 310 and the second device 320 while walking or lying as in FIG. 5).

Meanwhile, according to the present embodiment, a command to be carried out in response to an input event may be specified with reference to a relative relationship between the posture of the first device 310 and that of the second device 320 not only at the time of occurrence of the input event but also in a preset time interval including the time of occurrence of the input event (e.g., a time interval from three seconds before to three seconds after the time of occurrence of the input event).

Figure 6:
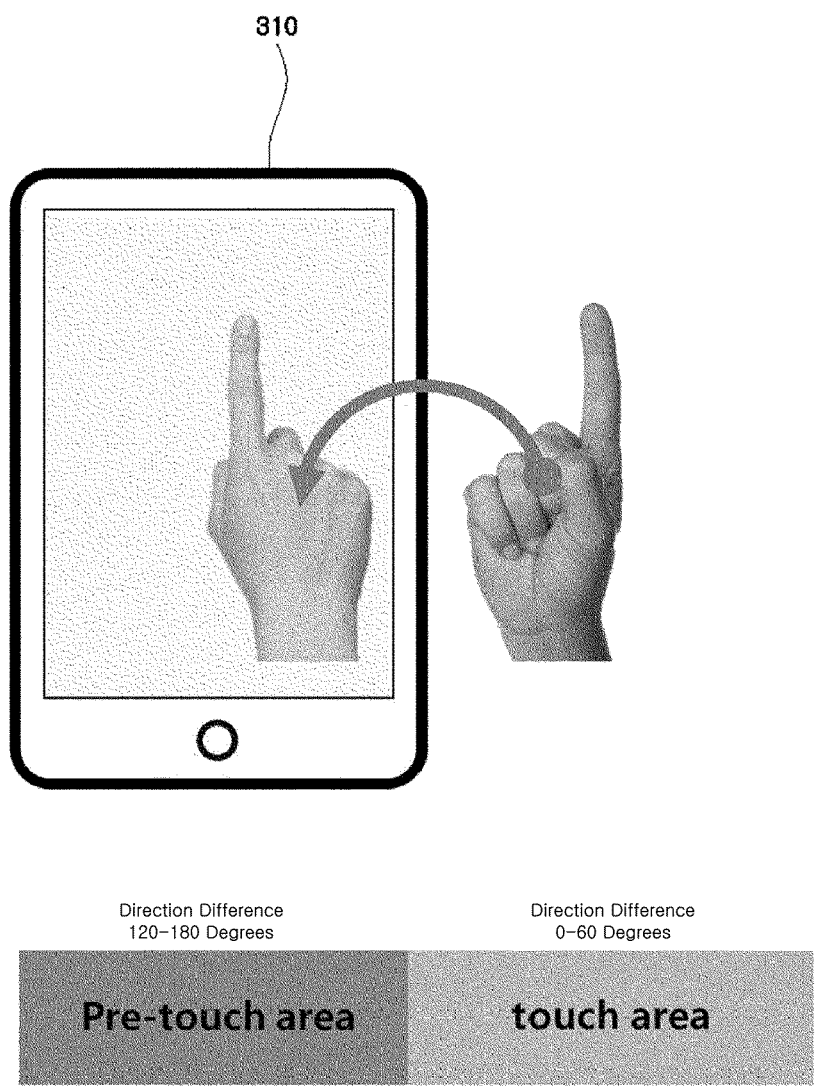
FIG. 6 illustratively shows how a user interface is provided according to the first embodiment of the disclosure.
Figure 7:
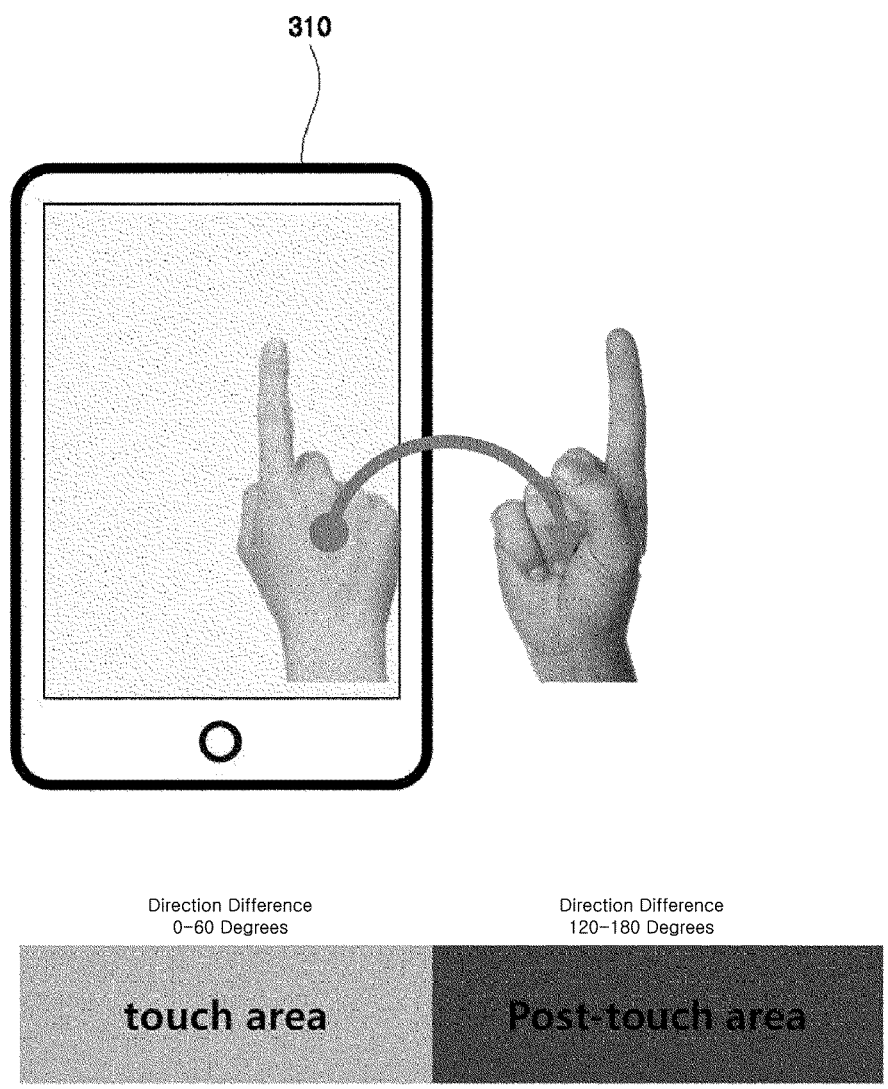
FIG. 7 illustratively shows how a user interface is provided according to the first embodiment of the disclosure.

FIGS. 6 and 7 illustratively show how a user interface is provided according to the first embodiment of the disclosure. In FIGS. 6 and 7, it may be assumed that a user generates an input event of touching a touch panel of the first device 310 by a finger or the like of the user's hand wearing the second device 320.

First, referring to FIG. 6, it may be assumed that before generating the input event, the user takes a posture such that the normal direction of a plane specifying the touch panel of the first device 310 is opposite (but not necessarily mathematically exactly opposite) to that of a plane specifying a front surface of the second device 320 (i.e., a posture in which a back of the hand wearing the second device 320 faces a display panel of the first device 310), and when generating the input event, the user turns over the hand to take a posture such that the normal direction of the plane specifying the touch panel of the first device 310 is equal (but not necessarily mathematically exactly equal) to that of the plane specifying the front surface of the second device 320 (i.e., a posture in which a palm of the hand wearing the second device 320 faces the display panel of the first device 310). The user interface provision system 200 according to the present embodiment may recognize such a posture change as a predetermined gesture (which is a so-called flip-and-touch gesture) and allow a predetermined command to be carried out in response thereto.

Next, referring to FIG. 7, it may be assumed that when generating the input event, the user takes a posture such that the normal direction of the plane specifying the touch panel of the first device 310 is equal (but not necessarily mathematically exactly equal) to that of the plane specifying the front surface of the second device 320 (i.e., a posture in which the palm of the hand wearing the second device 320 faces the display panel of the first device 310), and after generating the input event, the user turns over the hand to take a posture such that the normal direction of the plane specifying the touch panel of the first device 310 is opposite (but not necessarily mathematically exactly opposite) to that of the plane specifying the front surface of the second device 320 (i.e., a posture in which the back of the hand wearing the second device 320 faces the display panel of the first device 310). The user interface provision system 200 according to the present embodiment may recognize such a posture change as a predetermined gesture (which is a so-called touch-and-flip gesture) and allow a predetermined command to be carried out in response thereto.

2. Second Embodiment

According to the present embodiment, when an input event occurs, information on motions of the first device 310 and the second device 320 associated with the input event in a preset time interval including the time of occurrence of the input event may be acquired, and a command to be carried out in response to the input event may be determined on the basis of a relative relationship between the motion of the first device 310 and that of the second device 320.

Specifically, according to the present embodiment, the input event may occur on the first device 310, and the second device 320 may be integrally combined with an input means for generating the input event. Further, according to the present embodiment, a command to be carried out in response to the input event may be determined according to a relationship between the motion of the first device 310 and that of the second device 320, which are specified with respect to at least one coordinate axis in the preset time interval including the time of occurrence of the input event. For example, a change in a distance between the first device 310 and the second device 320, a direction in which the second device 320 is moved away from or toward the first device 310, or the like may be recognized in a preset time interval from before to after the time of occurrence of the input event, and a predetermined command may be carried out in response to each situation on the basis of the recognition.

FIGS. 8A to 10B illustratively show how a user interface is provided according to the second embodiment of the disclosure.

Figure 8A:
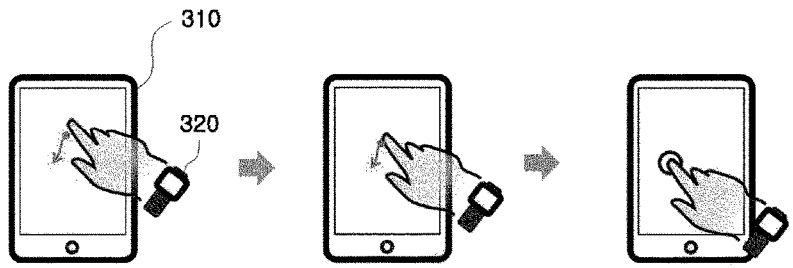
FIG. 8A illustratively shows how a user interface is provided according to a second embodiment of the disclosure.
Figure 8B:
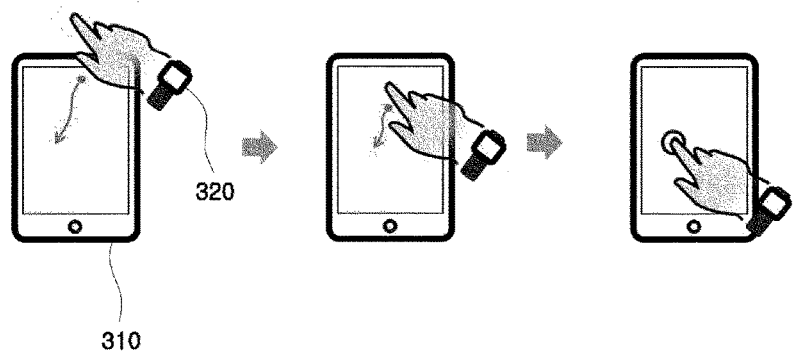
FIG. 8B illustratively shows how a user interface is provided according to a second embodiment of the disclosure.

First, referring to FIGS. 8A-8B, the user interface provision system 200 according to the present embodiment may discriminately recognize a situation in which a user with the second device 320 worn on the wrist moves the hand over a relatively short distance starting from the vicinity of the first device 310 to generate an input event of touching the first device 310 (see FIG. 8A) (which is a so-called touch), and a situation in which the user moves the hand over a relatively long distance starting far from the first device 310 to generate an input event of touching the first device 310 (FIG. 8B) (which is a so-called long-distance touch), and may allow a different command to be carried out in response to each situation.

Figure 9A:
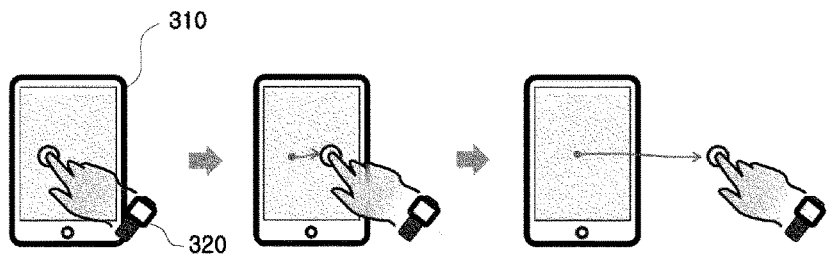
FIG. 9A illustratively shows how a user interface is provided according to a second embodiment of the disclosure.
Figure 9B:
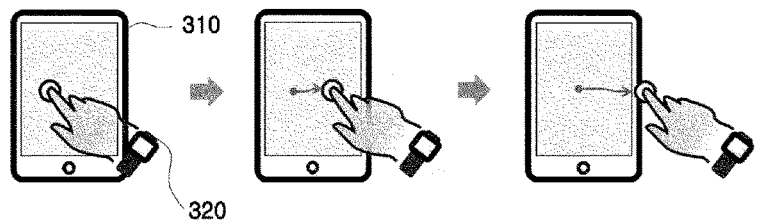
FIG. 9B illustratively shows how a user interface is provided according to a second embodiment of the disclosure.

Next, referring to FIGS. 9A-9B, the user interface provision system 200 according to the present embodiment may discriminately recognize a situation in which a user with the second device 320 worn on the wrist stops a drag action initiated from a point on a touch panel of the first device 310 near the border of the touch panel of the first device 310 (FIG. 9B) (which is a so-called drag), and a situation in which the user continues a drag action initiated from a point on the touch panel of the first device 310 past the border of the touch panel of the first device 310 (FIG. 9A) (which is a so-called long-distance drag), and may allow a different command to be carried out in response to each situation.

Figure 10A:
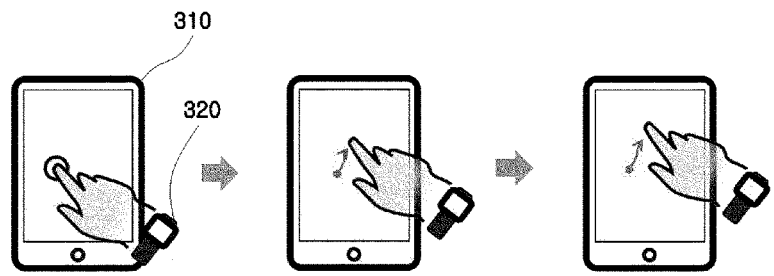
FIG. 10A illustratively shows how a user interface is provided according to a second embodiment of the disclosure.
Figure 10B:
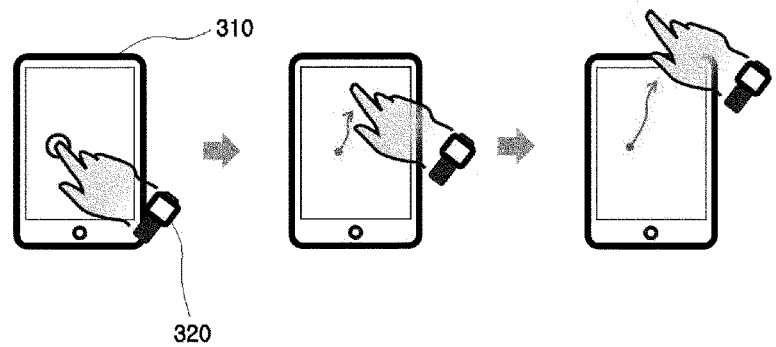
FIG. 10B illustratively shows how a user interface is provided according to a second embodiment of the disclosure.

Next, referring to FIGS. 10A-10B, the user interface provision system 200 according to the present embodiment may discriminately recognize a situation in which a user with the second device 320 worn on the wrist takes a release action of touching a point on the touch panel of the first device 310 and then moving the hand up to a position relatively close to the first device 310 (FIG. 10A) (which is a so-called release), and a situation in which the user takes a release action of touching a point on the touch panel of the first device 310 and then moving the hand up to a position relatively far from the first device 310 (FIG. 10B) (which is a so-called long-distance release), and may allow a different command to be carried out in response to each situation.

FIGS. 11 to 14 illustratively show how a user interface is provided according to the second embodiment of the disclosure.

Figure 11:
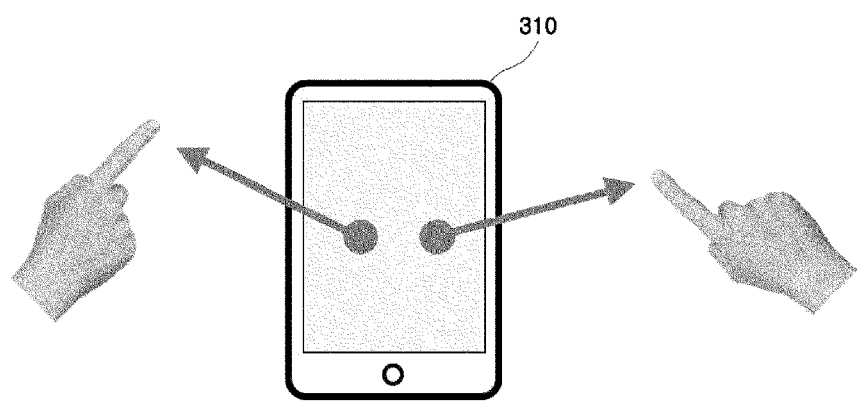
FIG. 11 illustratively shows how a user interface is provided according to the second embodiment of the disclosure.

First, referring to FIG. 11, the user interface provision system 200 according to the present embodiment may recognize that a user with the second device 320 worn on both of the wrists takes an action of continuing drag actions each initiated from two points on a touch panel of the first device 310 past the border of the touch panel of the first device 310 (which is a so-called long-distance zoom), and may allow a predetermined command (e.g., a zoom-in or zoom-out command) to be carried out in response thereto.

Figure 12:
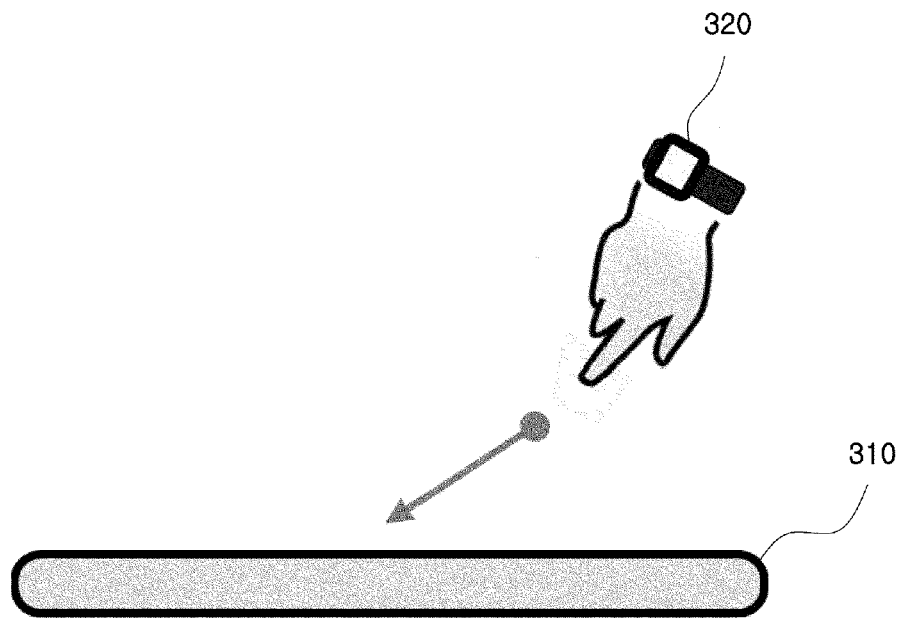
FIG. 12 illustratively shows how a user interface is provided according to the second embodiment of the disclosure.
Figure 13:
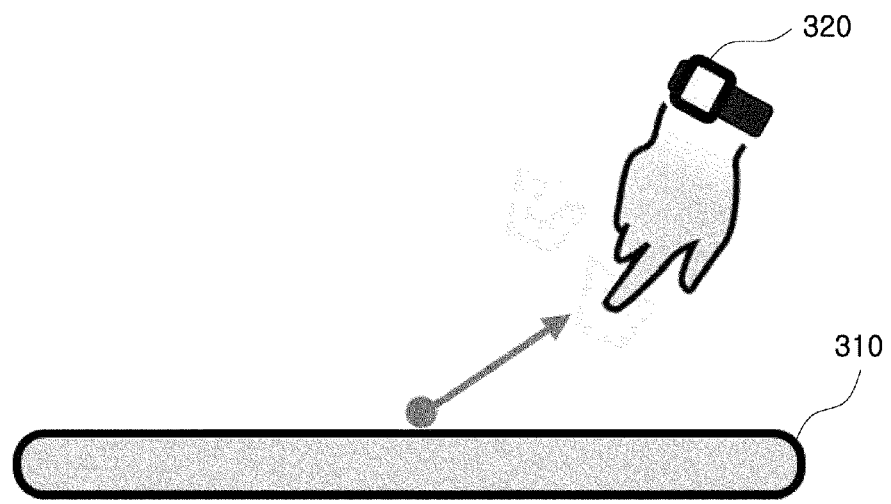
FIG. 13 illustratively shows how a user interface is provided according to the second embodiment of the disclosure.

Next, referring to FIGS. 12 and 13, the user interface provision system 200 according to the present embodiment may recognize that a user with the second device 320 worn on the wrist generates an input event of approaching the touch panel of the first device 310 in a predetermined direction and touching a point on the touch panel (see FIG. 12) (which is a so-called directional touch), or generates an input event of touching a point on the touch panel of the first device 310 and then retreating from the touch panel of the first device 310 in a predetermined direction (see FIG. 13) (which is a so-called directional touch), and may allow a predetermined command to be carried out in response to each input event.

Figure 14:
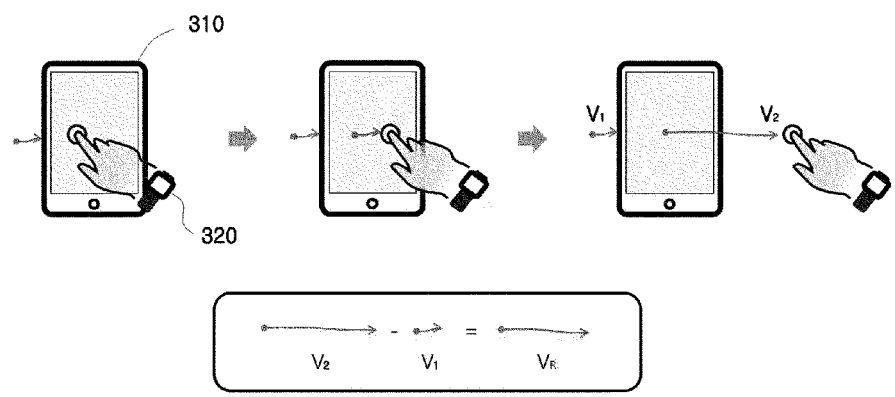
FIG. 14 illustratively shows how a user interface is provided according to the second embodiment of the disclosure.

Meanwhile, according to the present embodiment, since a command to be carried out in response to an input event is determined with reference to a relative relationship (VR=V2−V1) between the motion of the first device 310 (V1) and that of the second device 320 (V2) as shown in FIG. 14, the type of action taken by the user when generating the input event may be accurately recognized even if the first device 310 or the second device 320 is moved or rotated in an absolute coordinate system specifying a real-world space (e.g., even if the user uses the first device 310 and the second device 320 while walking or running).

3. Extended Embodiment

FIGS. 15A to 17B illustratively show how a user interface is provided according to an extended embodiment of the disclosure.

Figure 15A:
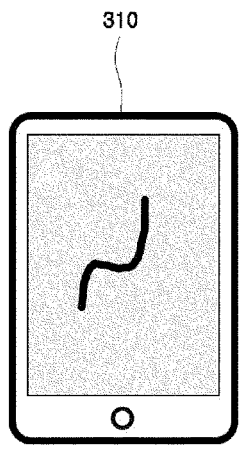
FIG. 15A illustratively shows how a user interface is provided according to an extended embodiment of the disclosure.
Figure 15B:
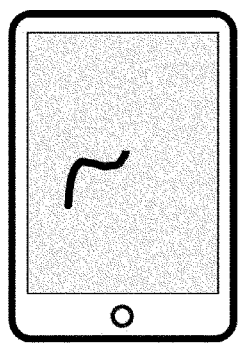
FIG. 15B illustratively shows how a user interface is provided according to an extended embodiment of the disclosure.
Figure 15C:
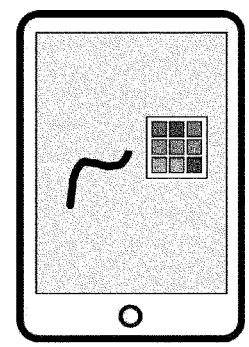
FIG. 15C illustratively shows how a user interface is provided according to an extended embodiment of the disclosure.

First, referring to FIGS. 15A-15C, when an input event occurs in which a user touches a touch panel of the first device 310 by a bottom finger surface of the hand wearing the second device 320 as in FIG. 2, a draw command may be carried out (FIG. 15A). When an input event occurs in which the user touches the touch panel of the first device 310 by a side finger surface of the hand wearing the second device 320 as in FIG. 3, an erase command may be carried out (FIG. 15B). When an input event occurs in which the user touches the touch panel of the first device 310 by a top finger surface of the hand wearing the second device 320 as in FIG. 4, a command for displaying a color selection menu may be carried out (FIG. 15C).

Figure 16A:
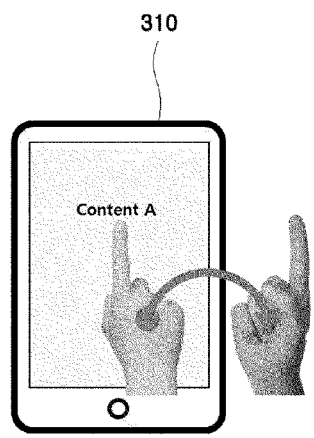
FIG. 16A illustratively shows how a user interface is provided according to an extended embodiment of the disclosure.
Figure 16B:
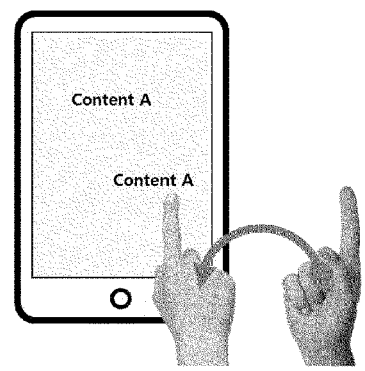
FIG. 16B illustratively shows how a user interface is provided according to an extended embodiment of the disclosure.

Next, referring to FIGS. 16A-16B, when an input event occurs in which the user makes a flip-and-touch gesture as in FIG. 6, a command for copying the content A selected by the touch may be carried out (FIG. 16A). When an input event occurs in which the user makes a touch-and-flip gesture as in FIG. 7, a command for pasting the previously copied content A at the touched position may be carried out (FIG. 16B).

Figure 17A:
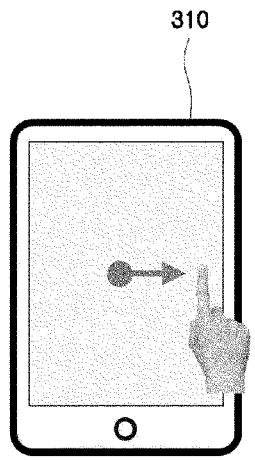
FIG. 17A illustratively shows how a user interface is provided according to an extended embodiment of the disclosure.
Figure 17B:
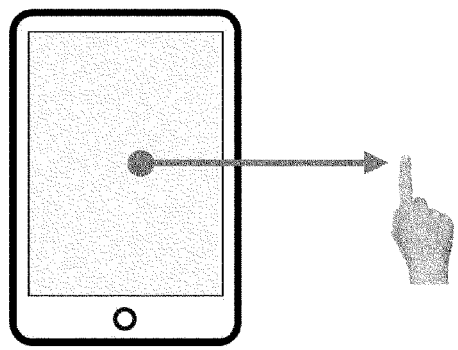
FIG. 17B illustratively shows how a user interface is provided according to an extended embodiment of the disclosure.

Next, referring to FIGS. 17A-17B, it may be assumed that an electronic book is displayed via a display panel of the first device 310. In this case, when an input event occurs in which a user with the second device 320 worn on the wrist stops a drag action initiated from a point on a touch panel of the first device 310 near the border of the touch panel of the first device 310, a command for turning a single page of the electronic book may be carried out (FIG. 17A). When an input event occurs in which the user with the second device 320 worn on the wrist continues a drag action initiated from a point on the touch panel of the first device 310 past the border of the touch panel of the first device 310, a command for turning several pages of the electronic book at once may be carried out (FIG. 17B).

Meanwhile, while an input event using the first device 310 and the second device 320 is being generated, the user interface provision system 200 according to the present embodiment may provide visual feedback in which information on a relative relationship between the posture or motion of the first device 310 and that of the second device 320 is visualized.

FIG. 18 illustratively shows visual feedback which is provided according to the extended embodiment of the disclosure.

Referring to FIG. 18, when an input event occurs in which a user with the second device 320 worn on the hand touches a touch panel of the first device 310 by a bottom, side, or top finger surface, a first graphical object 1810 in blue, orange, or green may be displayed where the touch is made on the touch panel of the first device 310. Referring further to FIG. 18, when the second device 320 is moved away from or toward the first device 310, information on a distance between the first device 310 and the second device 320, a relative velocity of the second device 320 with respect to the first device 310, and a direction in which the second device 320 is moved away from or toward the first device 310 may be visualized as a second graphical object 1820, which surrounds the first graphical object 1810 and is changed in size according to the property value of each piece of the information.

Figure 19A:
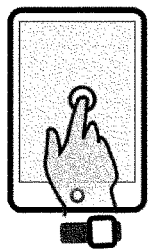
FIG. 19A illustratively shows how a user interface is provided according to another embodiment of the disclosure.
Figure 19B:
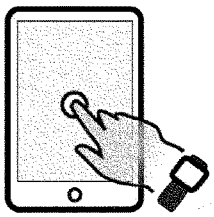
FIG. 19B illustratively shows how a user interface is provided according to another embodiment of the disclosure.
Figure 19C:
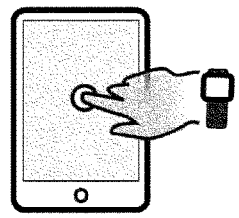
FIG. 19C illustratively shows how a user interface is provided according to another embodiment of the disclosure.
Figure 20A:
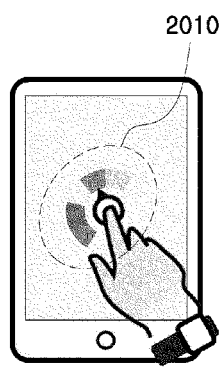
FIG. 20A illustratively shows how a user interface is provided according to another embodiment of the disclosure.
Figure 20B:
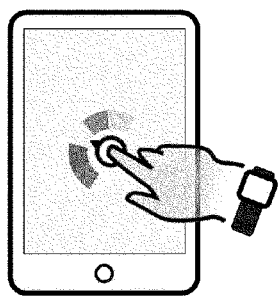
FIG. 20B illustratively shows how a user interface is provided according to another embodiment of the disclosure.
Figure 20C:
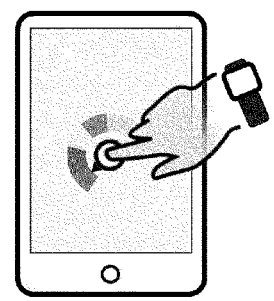
FIG. 20C illustratively shows how a user interface is provided according to another embodiment of the disclosure.

Meanwhile, it is noted that the types of recognizable input events and determinable commands in the present disclosure are not necessarily limited to the aforementioned ones, and may be changed without limitation as long as the objects of the disclosure may be achieved. For example, the user interface provision system 200 according to the disclosure may recognize the occurrence of an input event in which while touching a touch panel of the first device 310 by a bottom finger surface of a hand wearing the second device 320, a user rotates the hand around the touched contact point as a center, as shown in FIGS. 19A-19C, and may allow a command for rotating a graphical object 2010 like a dial to be carried out in response to the input event, as shown in FIGS. 20A-20C.

The embodiments according to the disclosure as described above may be implemented in the form of program instructions that can be executed by various computer components, and may be stored on a non-transitory computer-readable recording medium. The non-transitory computer-readable recording medium may include program instructions, data files, data structures and the like, separately or in combination. The program instructions stored on the non-transitory computer-readable recording medium may be specially designed and configured for the present disclosure, or may also be known and available to those skilled in the computer software field. Examples of the non-transitory computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler or the like, but also high-level language codes that can be executed by a computer using an interpreter or the like. The above hardware devices may be configured to operate as one or more software modules to perform the processes of the present disclosure, and vice versa.

Although the present disclosure has been described in terms of specific items such as detailed elements as well as the limited embodiments and the drawings, they are only provided to help more general understanding of the disclosure, and the present disclosure is not limited to the above embodiments. It will be appreciated by those skilled in the art to which the present disclosure pertains that various modifications and changes may be made from the above description.

Therefore, the spirit of the present disclosure shall not be limited to the above-described embodiments, and the entire scope of the appended claims and their equivalents will fall within the scope and spirit of the present subject matter.

What is claimed is:

1. A method for providing a user interface, the method comprising the steps of:
when an input event occurs in which a user wearing a second device touches a graphical object displayed on a first device, acquiring first information on a relative motion of the second device with respect to the first device in a preset time interval immediately preceding the time of occurrence of the input event, and acquiring second information on a relative motion of the second device with respect to the first device in a preset time interval immediately following the time of occurrence of the input event; and
determining display characteristics of the graphical object with reference to the first information and the second information,
wherein an input means for generating the input event and the second device are integrally moved, and
wherein the display characteristics of the graphical object are determined with reference to a relative velocity of the second device with respect to the first device in the preset time interval immediately preceding the time of occurrence of the input event, and a relative velocity of the second device with respect to the first device in the preset time interval immediately following the time of occurrence of the input event.

2. The method of claim 1, wherein the display characteristics of the graphical object are determined with reference to a relationship between a direction of the first device and a direction of the second device, which are specified with respect to at least one coordinate axis in the preset time interval immediately preceding the time of occurrence of the input event, and a relationship between the direction of the first device and the direction of the second device, which are specified with respect to at least one coordinate axis in the preset time interval immediately following the time of occurrence of the input event.

3. The method of claim 1, wherein the display characteristics of the graphical object are determined with reference to a change in a distance between the first device and the second device in the preset time interval immediately preceding the time of occurrence of the input event, and a change in a distance between the first device and the second device in the preset time interval immediately following the time of occurrence of the input event.

4. The method of claim 1, wherein the display characteristics of the graphical object are determined with reference to a direction in which the second device is moved toward or away from the first device in the preset time interval immediately preceding the time of occurrence of the input event, and a direction in which the second device is moved toward or away from the first device in the preset time interval immediately following the time of occurrence of the input event.

5. The method of claim 1, further comprising the step of:
providing visual feedback in which at least one of information on the input event, the first information, and the second information is visualized.

6. A non-transitory computer-readable recording medium having stored thereon a computer program, the computer program, when executed, causing a processor to implement a method for providing a user interface, the method comprising the steps of:
- when an input event occurs in which a user wearing a second device touches a graphical object displayed on a first device, acquiring first information on a relative motion of the second device with respect to the first device in a preset time interval immediately preceding the time of occurrence of the input event, and acquiring second information on a relative motion of the second device with respect to the first device in a preset time interval immediately following the time of occurrence of the input event; and
- determining display characteristics of the graphical object with reference to the first information and the second information,
- wherein an input means for generating the input event and the second device are integrally moved, and
- wherein the display characteristics of the graphical object are determined with reference to a relative velocity of the second device with respect to the first device in the preset time interval immediately preceding the time of occurrence of the input event, and a relative velocity of the second device with respect to the first device in the preset time interval immediately following the time of occurrence of the input event.

7. The non-transitory computer-readable recording medium of claim 6, wherein the display characteristics of the graphical object are determined with reference to a relationship between a direction of the first device and a direction of the second device, which are specified with respect to at least one coordinate axis in the preset time interval immediately preceding the time of occurrence of the input event, and a relationship between the direction of the first device and the direction of the second device, which are specified with respect to at least one coordinate axis in the preset time interval immediately following the time of occurrence of the input event.

8. The non-transitory computer-readable recording medium of claim 6, wherein the display characteristics of the graphical object are determined with reference to a change in a distance between the first device and the second device in the preset time interval immediately preceding the time of occurrence of the input event, and a change in a distance between the first device and the second device in the preset time interval immediately following the time of occurrence of the input event.

9. The non-transitory computer-readable recording medium of claim 6, wherein the display characteristics of the graphical object are determined with reference to a direction in which the second device is moved toward or away from the first device in the preset time interval immediately preceding the time of occurrence of the input event, and a direction in which the second device is moved toward or away from the first device in the preset time interval immediately following the time of occurrence of the input event.

10. The non-transitory computer-readable recording medium of claim 6, wherein the method further comprises:
- providing visual feedback in which at least one of information on the input event, the first information, and the second information is visualized.

11. A device for providing a user interface, comprising:
- an information acquisition element configured to, when an input event in which a user wearing another device touches a graphical object displayed on the device occurs, acquire first information on a relative motion of the another device with respect to the device in a preset time interval immediately preceding the time of occurrence of the input event, and acquire second information on a relative motion of the another device with respect to the device in a preset time interval immediately following the time of occurrence of the input event; and
- a program module for determining display characteristics of the graphical object with reference to the first information and the second information,
- wherein an input means for generating the input event and the another device are integrally moved, and
- wherein the display characteristics of the graphical object are determined with reference to a relative velocity of the another device with respect to the device in the preset time interval immediately preceding the time of occurrence of the input event, and a relative velocity of the another device with respect to the device in the preset time interval immediately following the time of occurrence of the input event.

12. A system for providing a user interface, comprising:
- a control unit for, when an input event occurs in which a user wearing a second device touches a graphical object displayed on a first device, acquiring first information on a relative motion of the second device with respect to the first device in a preset time interval immediately preceding the time of occurrence of the input event, acquiring second information on a relative motion of the second device with respect to the first device in a preset time interval immediately following the time of occurrence of the input event, and determining display characteristics of the graphical object with reference to the first information and the second information; and
- a storage for storing information provided from at least one of the first device and the second device,
- wherein an input means for generating the input event and the second device are integrally moved, and
- wherein the display characteristics of the graphical object are determined with reference to a relative velocity of the second device with respect to the first device in the preset time interval immediately preceding the time of occurrence of the input event, and a relative velocity of the second device with respect to the first device in the preset time interval immediately following the time of occurrence of the input event.

* * * * *